United States Patent
Pan et al.

(10) Patent No.: US 9,767,831 B1
(45) Date of Patent: Sep. 19, 2017

(54) MAGNETIC WRITER HAVING CONVEX TRAILING SURFACE POLE AND CONFORMAL WRITE GAP

(71) Applicant: Western Digital (Fremont), LLC, Fremont, CA (US)

(72) Inventors: Yu Pan, Fremont, CA (US); Yugang Wang, Milpitas, CA (US); Zhigang Bai, Fremont, CA (US); Tao Lin, San Jose, CA (US); Peng Zhao, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/956,168

(22) Filed: Dec. 1, 2015

(51) Int. Cl.
   *G11B 5/31* (2006.01)
   *G11B 5/187* (2006.01)
   *G11B 5/11* (2006.01)
   *G11B 5/23* (2006.01)
   *G11B 5/127* (2006.01)

(52) U.S. Cl.
   CPC ............ *G11B 5/3116* (2013.01); *G11B 5/112* (2013.01); *G11B 5/1278* (2013.01); *G11B 5/1871* (2013.01); *G11B 5/23* (2013.01); *G11B 5/232* (2013.01); *G11B 5/315* (2013.01)

(58) Field of Classification Search
   None
   See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |

(Continued)

*Primary Examiner* — Craig A. Renner
(74) *Attorney, Agent, or Firm* — Foley & Lardner LLP

(57) ABSTRACT

A magnetic write apparatus has a media-facing surface (MFS), a pole, a write gap, a top shield and coil(s). The pole includes a yoke and a pole tip. The pole tip includes a bottom, a top wider than the bottom and first and second sides. The pole tip has a height between the top and the bottom. At least part of the top of the pole tip is convex in a cross-track direction between the first and second sides such that the height at the MFS is larger between the first and second sides than at the first and second sides. The height increases in a yoke direction perpendicular to the MFS. The write gap is adjacent to and conformal with the top of the pole at the MFS and is between part of the top shield and the pole. The top shield is concave at the MFS.

19 Claims, 9 Drawing Sheets

(56) References Cited

U.S. PATENT DOCUMENTS

| | | |
|---|---|---|
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |

(56) References Cited

U.S. PATENT DOCUMENTS

| | | |
|---|---|---|
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,950,277 B1 | 9/2005 | Nguy et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,437 B2 | 7/2007 | Yazawa et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,628 B2 | 10/2008 | Kameda et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,464,457 B2 | 12/2008 | Le et al. |
| 7,477,481 B2 | 1/2009 | Guthrie et al. |

(56) References Cited

U.S. PATENT DOCUMENTS

| | | |
|---|---|---|
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,451 B2 | 12/2009 | Yatsu et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,715,147 B2 | 5/2010 | Feldbaum et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,742,259 B2 | 6/2010 | Kameda et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,821,736 B2 | 10/2010 | Che et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,978,430 B2 | 7/2011 | Le et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,054,586 B2 | 11/2011 | Balamane et al. |
| 8,066,892 B2 | 11/2011 | Guthrie et al. |
| 8,066,893 B2 | 11/2011 | Baer et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,108,986 B2 | 2/2012 | Liu |
| 8,116,043 B2 | 2/2012 | Leng et al. |
| 8,116,171 B1 | 2/2012 | Lee |
| 8,125,732 B2 | 2/2012 | Bai et al. |
| 8,125,856 B1 | 2/2012 | Li et al. |
| 8,134,794 B1 | 3/2012 | Wang |
| 8,134,802 B2 | 3/2012 | Bai et al. |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,159,769 B2 | 4/2012 | Batra et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,078 B1 | 11/2012 | Zeltser et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,737 B2 | 12/2012 | Mino et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,351,308 B2 | 1/2013 | Chou et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,379,347 B2 | 2/2013 | Guan et al. |

(56) References Cited

U.S. PATENT DOCUMENTS

| | | |
|---|---|---|
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,468,683 B2 | 6/2013 | Mao et al. |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,660 B2 | 10/2013 | Allen et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,570,686 B2 | 10/2013 | Hosomi et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,210 B2 | 7/2014 | de la Fuente et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,824,101 B2 | 9/2014 | Edelman |
| 8,828,248 B2 | 9/2014 | Mao et al. |
| 8,873,201 B2 | 10/2014 | Benakli et al. |
| 8,988,824 B1 | 3/2015 | Brinkman et al. |
| 9,013,830 B2 | 4/2015 | Guan |
| 9,042,051 B2 | 5/2015 | Zeng et al. |
| 9,082,423 B1 | 7/2015 | Liu et al. |
| 2002/0024755 A1* | 2/2002 | Kim et al. ........ G11B 5/1278 360/125.03 |
| 2002/0080523 A1* | 6/2002 | Sato et al. ........ G11B 5/1278 360/125.13 |
| 2007/0188918 A1* | 8/2007 | Im et al. .......... G11B 5/1278 360/125.03 |
| 2009/0310244 A1 | 12/2009 | Shimazawa et al. |
| 2010/0265616 A1* | 10/2010 | Ohtake et al. ...... G11B 5/1278 360/110 |

(56) References Cited

U.S. PATENT DOCUMENTS

| | | | |
|---|---|---|---|
| 2010/0277832 A1* | 11/2010 | Bai et al. | G11B 5/1278 360/125.03 |
| 2010/0290157 A1 | 11/2010 | Zhang et al. | |
| 2011/0086240 A1 | 4/2011 | Xiang et al. | |
| 2012/0111826 A1 | 5/2012 | Chen et al. | |
| 2012/0216378 A1 | 8/2012 | Emley et al. | |
| 2012/0237878 A1 | 9/2012 | Zeng et al. | |
| 2012/0298621 A1 | 11/2012 | Gao | |
| 2013/0216702 A1 | 8/2013 | Kaiser et al. | |
| 2013/0216863 A1 | 8/2013 | Li et al. | |
| 2013/0257421 A1 | 10/2013 | Shang et al. | |
| 2014/0153134 A1* | 6/2014 | Han et al. | G11B 5/315 360/125.03 |
| 2014/0154529 A1 | 6/2014 | Yang et al. | |
| 2014/0175050 A1 | 6/2014 | Zhang et al. | |
| 2014/0326699 A1 | 11/2014 | Hsiao et al. | |
| 2014/0376124 A1 | 12/2014 | Albrecht et al. | |
| 2016/0035374 A1* | 2/2016 | Takagishi et al. | G11B 5/1278 360/125.03 |

\* cited by examiner

MAGNETIC WRITER HAVING CONVEX TRAILING SURFACE POLE AND CONFORMAL WRITE GAP

BACKGROUND

FIG. 1 depicts an air-bearing surface (ABS) view of a conventional magnetic recording apparatus 10. The magnetic recording apparatus 10 may be a perpendicular magnetic recording (PMR) apparatus or other magnetic write apparatus. The conventional magnetic recording apparatus 10 may be a part of a merged head including the write apparatus 10 and a read apparatus (not shown). Alternatively, the magnetic recording head may only include the write apparatus 10.

The write apparatus 10 includes a leading shield 12, side shield(s) 14, gap 16, a pole 20 and a trailing shield 30. The apparatus 10 may also include other components including but not limited to coils for energizing the pole 20. The top (trailing surface) of the pole 20 is wider than the bottom (leading surface) of the pole 20.

Although the conventional magnetic recording apparatus 10 functions, there are drawbacks. In particular, the conventional magnetic write apparatus 10 may not perform sufficiently at higher recording densities. For example, at higher recording densities, the pole 20 is desired to be smaller, at least at the ABS. The conventional write apparatus 10 may be not provide a sufficiently high field or the desired field gradient for writing to a media (not shown). Stated differently, the writeability of the conventional pole 20 may suffer. Accordingly, what is needed is a system and method for improving the performance of a magnetic recording head, particularly at higher areal densities.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems, for the purposes of illustration the description below uses disk drives as examples.

Figure 1:
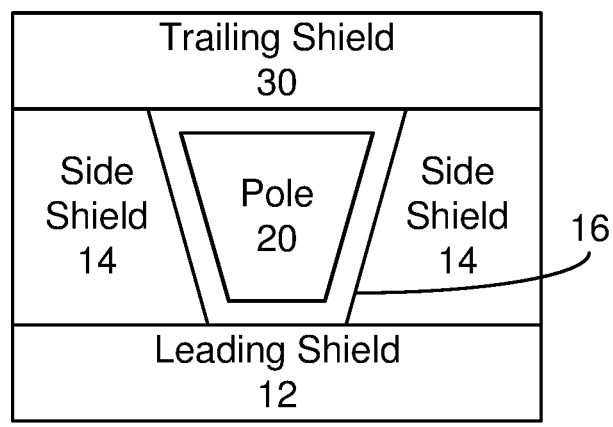
FIG. 1 depicts an ABS view of a conventional magnetic recording apparatus.
Figure 2A:
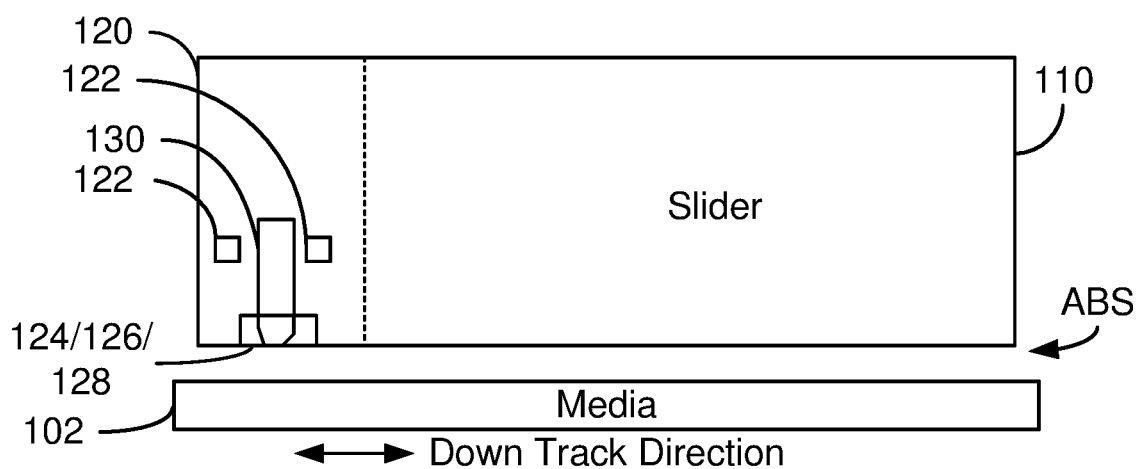
FIGS. 2A, 2B, 2C and 2D depict side, MFS, recessed and apex views of an exemplary embodiment of a magnetic write apparatus usable in a magnetic recording disk drive.
Figure 2B:
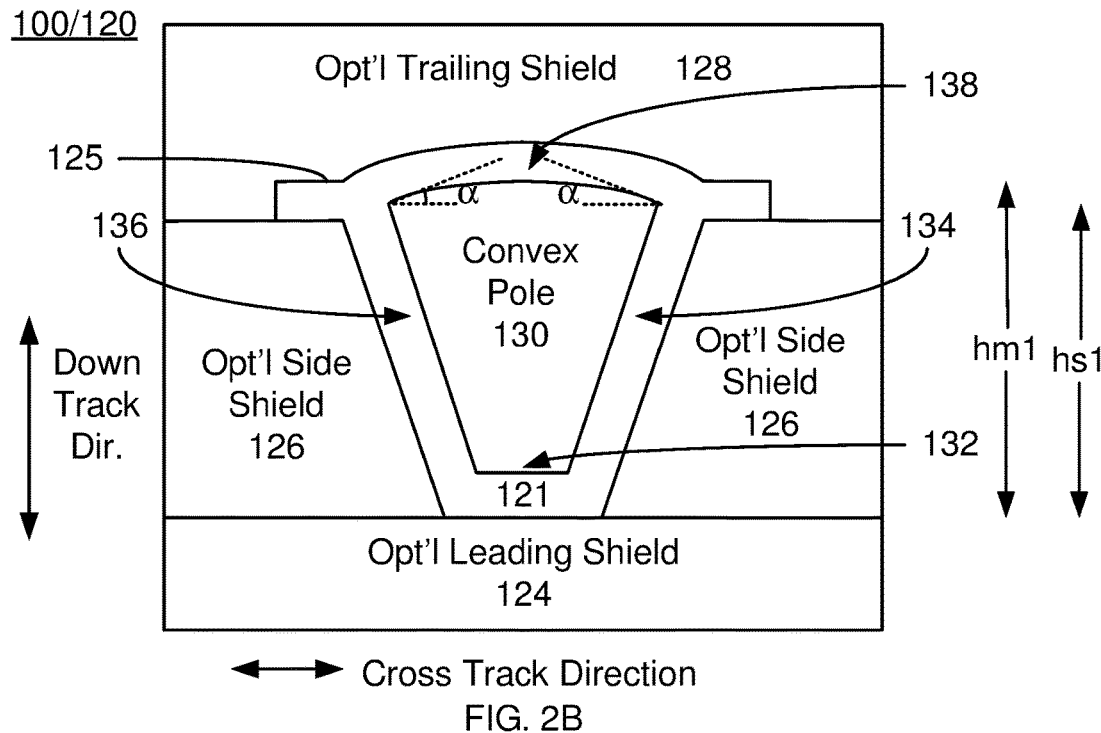
Figure 2C:
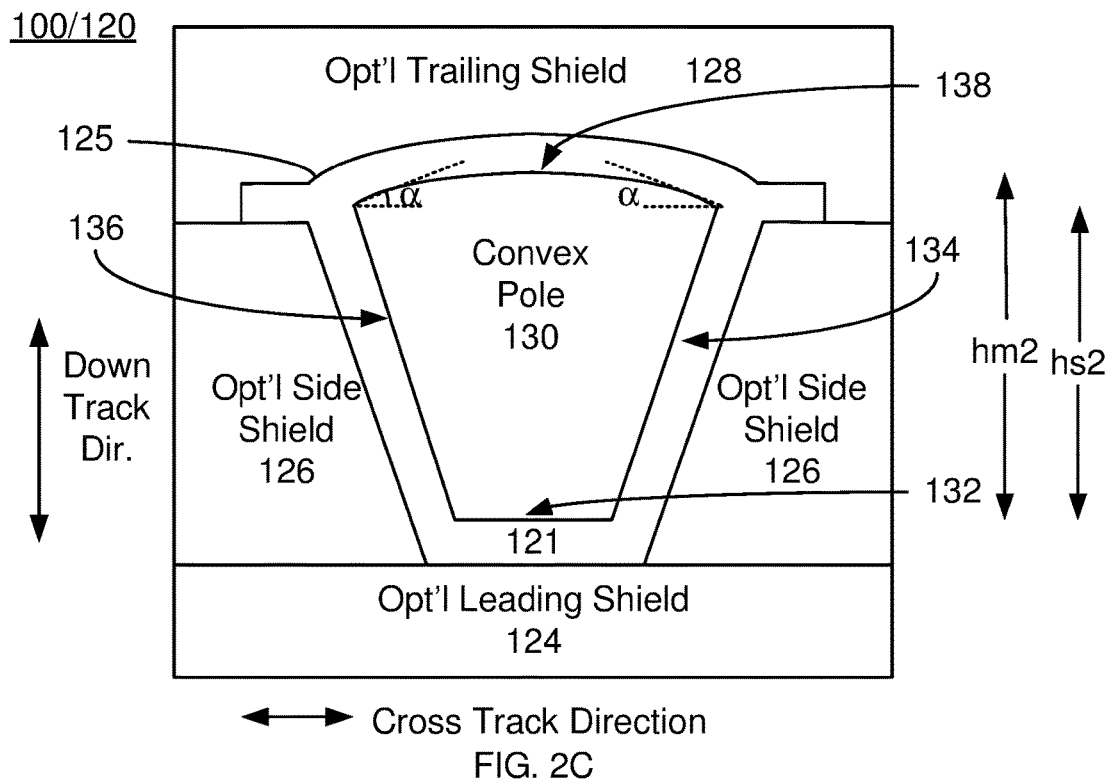
Figure 2D:
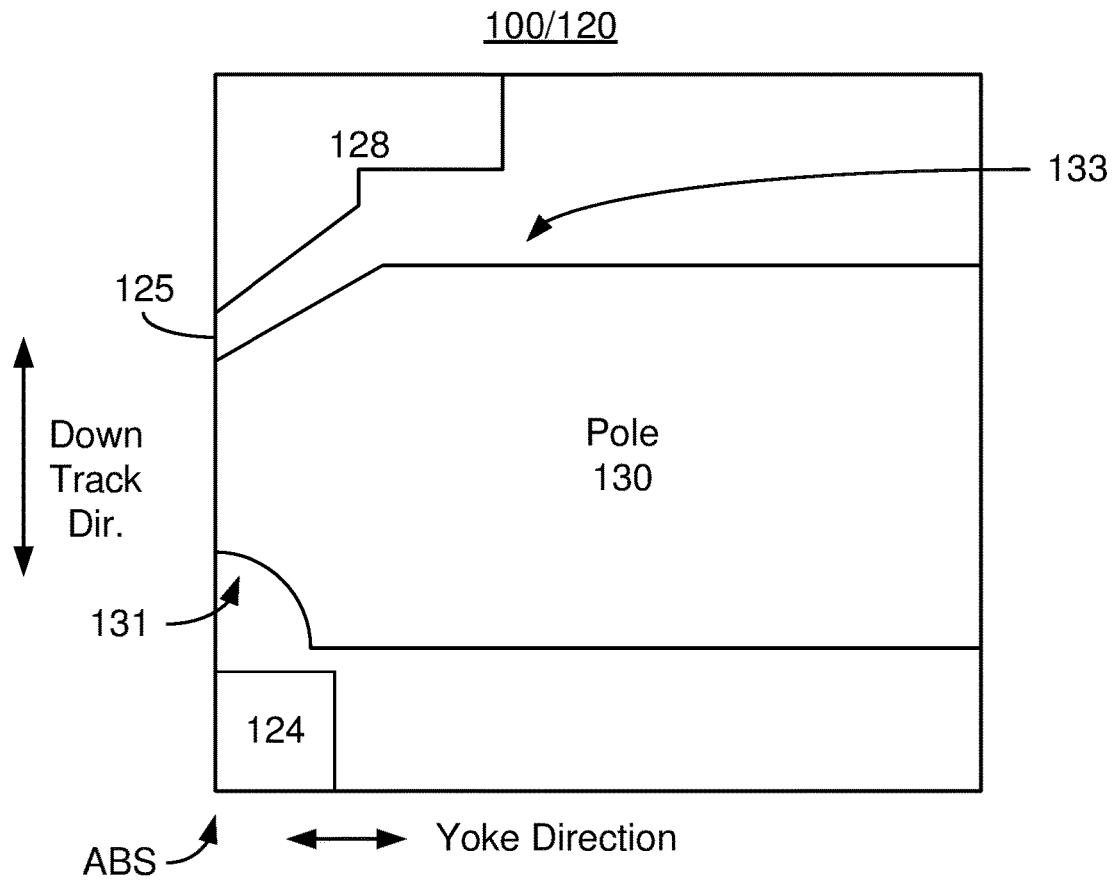

FIGS. 2A, 2B, 2C and 2D depict side, media-facing surface (MFS), yoke and apex views of an exemplary embodiment of a magnetic write apparatus 120 usable in a magnetic recording disk drive 100. FIG. 2A depicts a side view of the disk drive 100. FIG. 2B depicts an MFS view of the write apparatus 120. FIG. 2C depicts a recessed view of the write apparatus 120. Thus, the view taken in FIG. 2C at a distance from the ABS in the yoke direction perpendicular to the ABS. FIG. 2D is an apex view of the write apparatus. For clarity, FIGS. 2A-2D are not to scale. For simplicity not all portions of the disk drive 100 and write apparatus 120 are shown. In addition, although the disk drive 100 and write apparatus 120 are depicted in the context of particular components other and/or different components may be used. For example, circuitry used to drive and control various portions of the disk drive is not shown. Only single components are shown. However, multiples of each components and/or their sub-components, might be used. The write apparatus 120 may be a perpendicular magnetic recording (PMR) writer. However, in other embodiments, the write apparatus 120 may be configured for other types of magnetic recording. The disk drive 100 typically includes the write apparatus 120 and a read apparatus. However, only the write apparatus 120 is depicted.

The disk drive 100 includes a media 102, and a slider 110 on which the write apparatus 120 has been fabricated. Although not shown, the slider 110 and thus the write apparatus 120 are generally attached to a suspension. The write apparatus 120 includes a media-facing surface (MFS). Because the write apparatus 120 is used in a disk drive, the MFS is an air-bearing surface (ABS).

The write apparatus 120 includes coil(s) 122, side gap 121, optional leading (bottom) shield 124, optional side shields 126, a pole 130, write gap 125 and trailing (top) shield 128. The trailing shield 128 is separated from the pole 130 by the write gap 125. Similarly, the side shields 126 and bottom shield 124 are separated from the sidewalls of the pole 130 by gap 121. Although shown as a single gap 121, the side gap and bottom gap may be fabricated separately. The gap 121 and write gap 125 are nonmagnetic. The side shields 124 may be magnetically connected with the trailing shield 128 and/or the leading shield 124. The coils 122 are used to energize the pole 130. Although one turn is shown in FIG. 2A, another number may be used. For example, in some embodiments, additional turns (not shown in FIG. 2A) may be used. The coil(s) 122 may be helical or spiral coils.

The pole 130 includes a pole tip 131 closer to the ABS and a yoke 133 further from the ABS. In the embodiment shown, a portion of the pole tip 131 occupies the ABS. The pole tip 131 has sidewalls 134 and 136, bottom (leading surface) 132 and top (trailing surface) 138. In the embodiment shown, the top 138 of the pole tip is wider than the bottom 132 in the cross track direction. In some embodiments, the track width of the pole 130 in the cross-track direction is on the order of at least forty and not more than sixty nanometers. However, other track widths, including smaller track widths, are possible.

The top 138 of the pole tip 131 is convex. More specifically, the top 138 of the pole tip 131 is a convex curved surface. The pole tip 131 thus has a height between the top 138 and the bottom 132 that varies across the ABS. The height at the center, hm1, is larger than the height at the edges, hs1, of the pole tip 131. The top 138 of the pole tip 131 forms angle α with the cross-track direction at the edges 134 and 136. This angle is greater than zero degrees and not more than twenty degrees. The angle may also not exceed fifteen degrees in some cases. In some embodiments, this angle is at least five degrees and not more than ten degrees. In the embodiment shown, the angles the top 138 makes at the sides 134 and 136 are the same. Stated differently, the convex top 138 of the pole tip 131 is symmetric in the cross-track direction. The maximum height is at the center of the pole tip 131. In some embodiments, the maximum height, hm1, at the ABS is not more than one hundred nanometers. In some embodiments the maximum height at the ABS may be at least eighty nanometers. However, other heights are possible. In the embodiment shown, the entire top 138 of the pole tip 131 is convex. In other embodiments, only a portion of the top 138 is convex.

In addition, as can be seen in FIGS. 2B-20, the height and width of the pole 130 increase in the yoke direction. The top 138 of the pole tip 131 is beveled such that the height increases in the yoke direction perpendicular to the ABS. In the embodiment shown, the bottom 132 of the pole tip 131 is also beveled. This may be best seen in FIG. 20. However, in other embodiments the bottom 132 may be flat. For example, at the ABS, the pole tip 131 has maximum height hm1 as shown in FIG. 2B. At some distance from the ABS in the yoke direction, the pole tip 131 has a larger maximum height hm2. The height at the edges 134, 136 in FIG. 2B is hs2. Similarly, as can be seen in FIGS. 2B and 2C, the width of the pole tip 131 increases. However, as is indicated in FIGS. 2B and 2C, the angle(s) the top 138 makes with the cross-track direction are substantially constant. Because the angles α are substantially constant and the pole tip 131 widens, the height of the pole tip 131 naturally increases for the embodiment shown in FIGS. 2A-2D.

At the ABS, the write gap 125 is conformal with the top 138 of the pole tip 131 in the cross-track direction. Because the write gap 125 is conformal, the portion of the trailing shield 128 opposite to the convex portion of the pole tip top 138 may be concave. In some embodiments, the write gap 125 is thin. For example, the write gap 125 may be less than thirty nanometers. In some embodiments, the write gap 125 may not exceed twenty-five nanometers. However, other thicknesses are possible. In the embodiment shown, the write gap 125 also includes overhangs which extend past the gap 121 and reside over a portion of the side shields 126. Although the write gap 125 is conformal in the cross-track direction, the write gap 125 can, but need not be, conformal with the top 138 of the pole tip 131 in the yoke direction. For example, as can be seen in FIG. 2D, the thickness of the write gap 125 increases slightly in the yoke direction perpendicular to the ABS.

Figure 3:
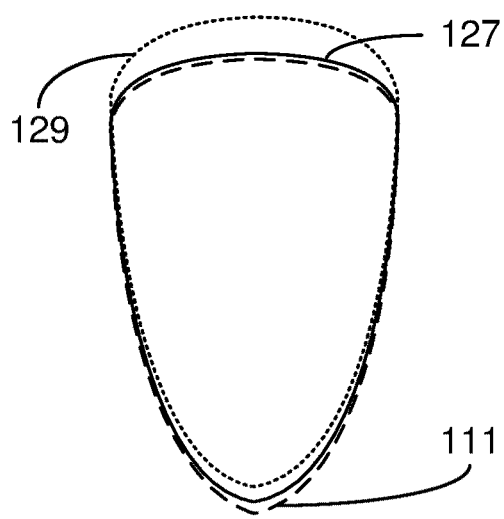
FIG. 3 depicts a view of the field profile at the media.

The disk drive 100 and write apparatus 120 may have improved performance at higher magnetic recording areal densities. The convex top 138 of the pole tip 131 allows the volume of the pole 130 to be increased for a constant track width. Thus, the pole 130 may provide a higher magnetic field and more desirable magnetic field gradient. It was believed that the convex top 138 might adversely affect the shape of the magnetic field provided to the media. However, for the angles, a, in the ranges described above, the change in the magnetic field shape is sufficiently small that an improvement in writeability due to the increased magnetic volume offsets any change in the magnetic field profile. For example, FIG. 3 depicts various magnetic field shapes 111, 127 and 129. Note that the curves 111, 127 and 129 are for explanation only and do not represent specific data from real-world devices. The dashed curve 111 indicates the field shape for a pole having a flat top. The solid curve 127 indicates the magnetic field shape for the pole 130 having an angle α of approximately five degrees. The dotted curve 129 indicates the magnetic field shape for the pole 130 having an angle α of approximately fifteen degrees. Thus, although the magnetic field changes, particularly near the top, the change may be sufficiently small that other benefits outweigh the change in the field profile from the angle ranges described above. Thus, field magnitude and gradient may be improved without unduly compromising the field shape. Consequently, the magnetic write apparatus 120 may exhibit improved performance, particularly at higher areal recording densities.

Figure 4A:
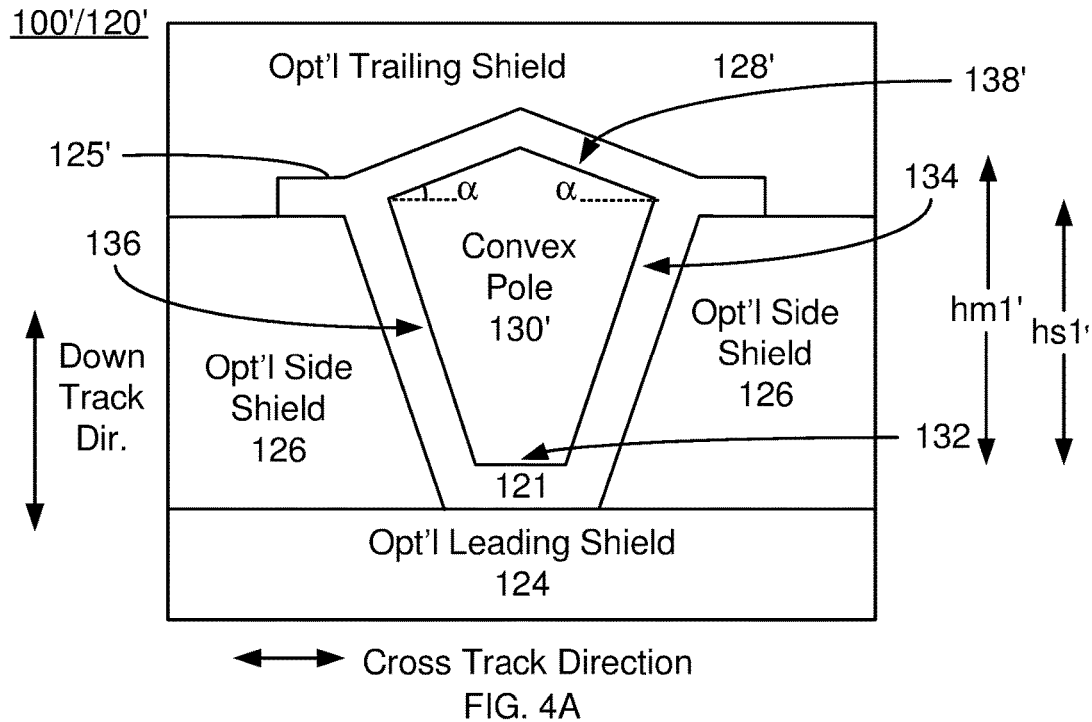
FIGS. 4A and 4B depict ABS and recessed views of another exemplary embodiment of a magnetic write apparatus usable in a magnetic recording disk drive.
Figure 4B:
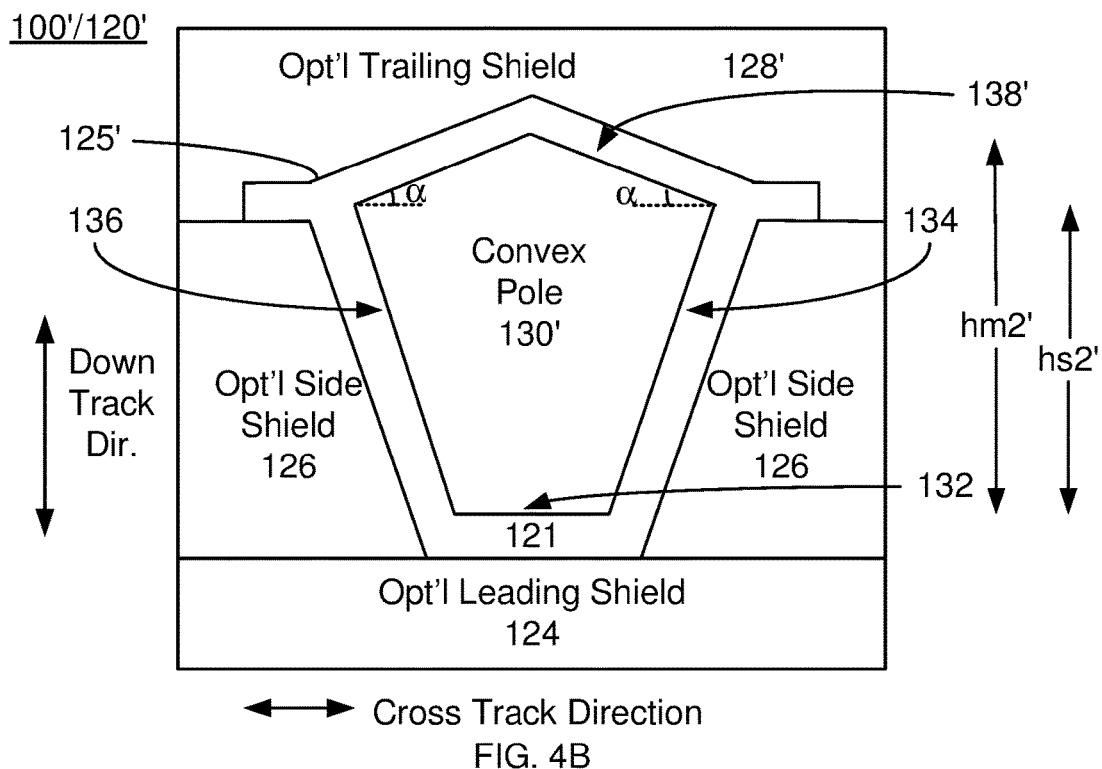

FIGS. 4A and 4B depict ABS and recessed views of another embodiment of a disk drive 100' and magnetic write apparatus 120'. For clarity, FIGS. 4A and 4B are not to scale. For simplicity not all portions of the disk drive 100'/write apparatus 120' are shown. In addition, although the disk drive 100'/write apparatus 120' is depicted in the context of particular components other and/or different components may be used. For example, circuitry used to drive and control various portions of the disk drive is not shown. For simplicity, only single components are shown. However, multiples of each components and/or their sub-components, might be used. Thus, the write apparatus 120' includes a gap 121, an optional leading shield 124, write gap 125', optional side shields 126, optional trailing shield 128' and convex pole 130' having a pole tip, yoke (not explicitly labeled), bottom 132, sides 134 and 136 and top 138' that are analogous to gap 121, optional leading shield 124, write gap 125, optional side shields 126, optional trailing shield 128 and convex pole 130 having pole tip 131, yoke 133, bottom 132, sides 134 and 136 and top 138, respectively.

The pole tip for pole 130' may have a width in the cross-track direction and height in the down track direction analogous to that described above for the pole tip 131. The top 138' of the pole tip is convex. More specifically, the top 138' of the pole tip is a convex peaked surface. The pole tip 131 thus has a height between the top 138 and the bottom 132 that varies across the ABS. The height at the center, hm1', is larger than the height at the edges, hs1', of the pole tip. The top 138' of the pole tip forms angle α with the cross-track direction at the edges 134 and 136. This angle for the pole tip of the pole 130' is in the same range as that for the pole tip 131 of the pole 130. In the embodiment shown, the angles the top 138' makes at the sides 134 and 136 are the same. Stated differently, the convex top 138' of the pole tip 131 is symmetric in the cross-track direction. The maximum height is at the center of the pole tip. In the embodiment shown, the entire top 138' of the pole tip is convex. In other embodiments, only a portion of the top 138' is convex.

In addition, the height and width of the pole tip for pole 130 increase in the yoke direction. For example, at the ABS, the pole tip has maximum height hm1' as shown in FIG. 4A. At some distance from the ABS in the yoke direction, the pole tip has a larger maximum height hm2' as shown in FIG. 4B. The height at the sides 134, 136 is hs2'. Similarly, as can be seen in FIGS. 4A and 4B, the width of the pole tip increases. However, as is indicated in FIGS. 4A and 4B, the angle(s) the top 138' makes with the cross-track direction are substantially constant. Because the angles α are substantially constant and the pole tip widens, the height of the pole tip naturally increases.

At the ABS, the write gap 125' is conformal with the top 138' of the pole tip in the cross-track direction. Because write gap 125' is conformal, the portion of the trailing shield 128' opposite to the convex portion of the top 138' may be concave. In the embodiment shown, the write gap 125' also includes overhangs which extend past the gap 121 and reside over a portion of the side shields 126'. The thickness of the write gap 125' may also be in the range described above for the write gap 125. Although the write gap 125' is conformal in the cross-track direction, the write gap 125' can, but need not be, conformal with the top 138' of the pole tip in the yoke direction.

The disk drive 100' and write apparatus 120' may have improved performance at higher magnetic recording areal densities. The convex top 138' of the pole tip allows the volume of the pole 130' to be increased for a constant track width. Thus, the pole 130' may provide a higher magnetic field and more desirable magnetic field gradient. Thus, field magnitude and gradient may be improved without unduly compromising the field shape. Consequently, the magnetic write apparatus 120' may exhibit improved performance, particularly at higher areal recording densities.

Figure 5A:
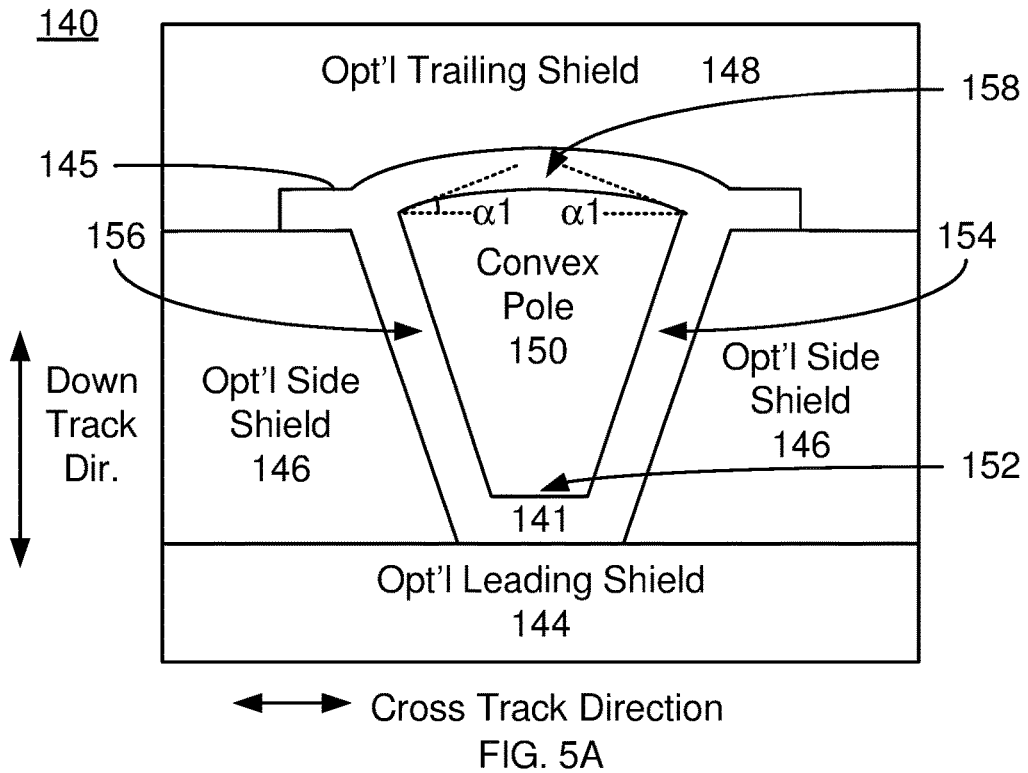
FIGS. 5A, 5B and 5C depict MFS, recessed and apex views of another exemplary embodiment of a magnetic write apparatus usable in a magnetic recording disk drive.
Figure 5B:
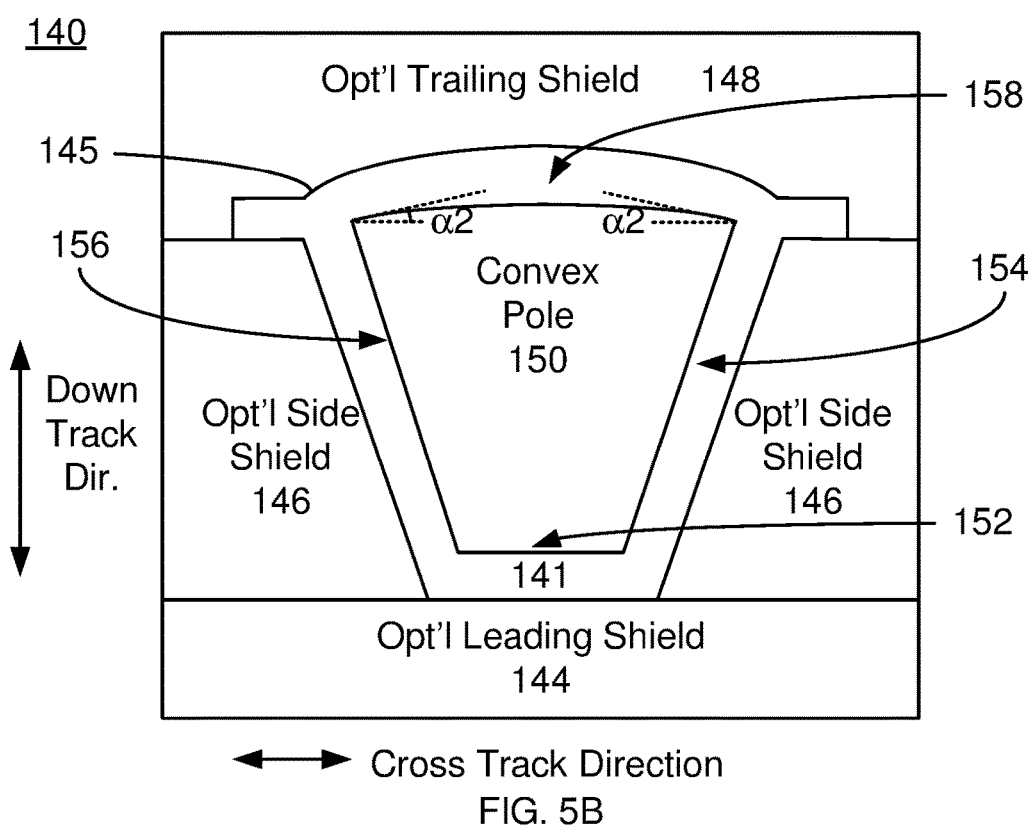
Figure 5C:
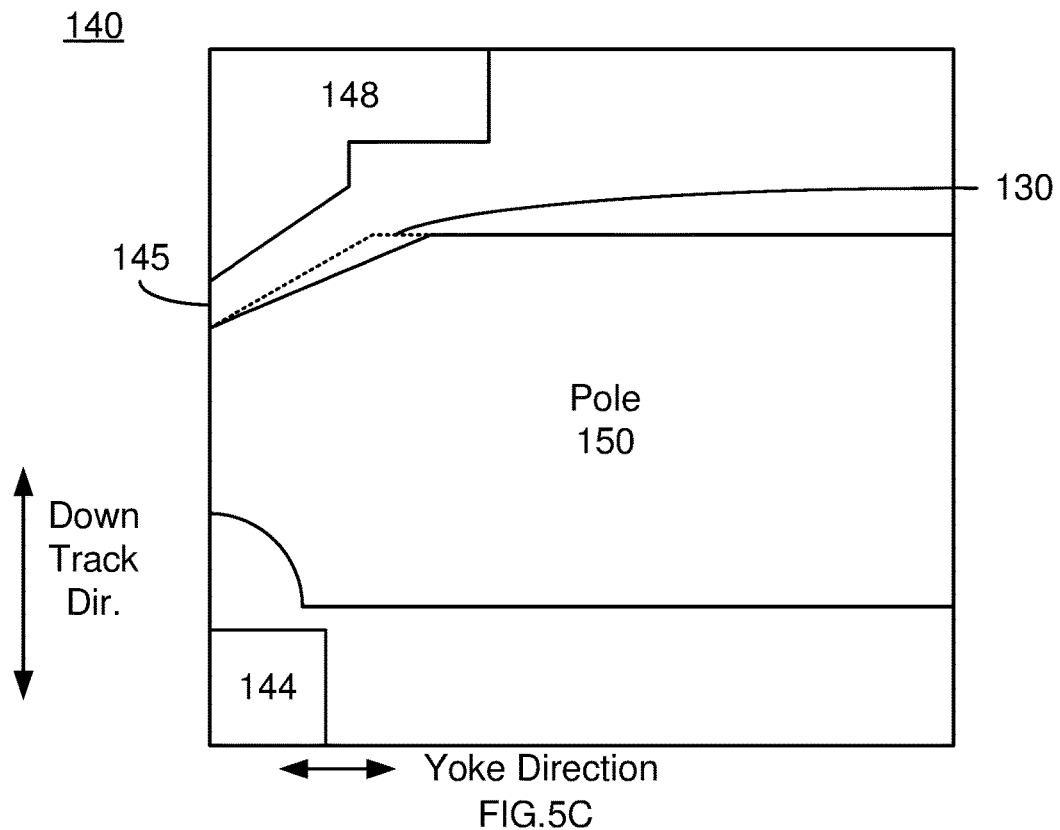

FIGS. 5A, 5B and 5C depict ABS, recessed and apex views of another embodiment of a magnetic write apparatus 140. For clarity, FIGS. 5A-5C are not to scale. For simplicity not all portions of the write apparatus 140 are shown. In addition, although the write apparatus 140 is depicted in the context of particular components other and/or different components may be used. For example, circuitry used to drive and control various portions of the disk drive is not shown. For simplicity, only single components are shown. However, multiples of each components and/or their sub-components, might be used. Thus, the write apparatus 140 includes a gap 141, an optional leading shield 144, write gap 145, optional side shields 146, optional trailing shield 148 and convex pole 150 having a pole tip, yoke (not explicitly labeled), bottom 152, sides 154 and 156 and top 158 that are analogous to the gap, optional leading shield, write gap, optional side shields, optional trailing shield and convex pole having pole tip, yoke, bottom, sides and top, respectively, described above.

The pole tip for pole 150 may have a width in the cross-track direction and height in the down track direction analogous to that described above for the pole tip 131 of the pole 130/130'. The top 158 of the pole tip is a convex curved surface analogous to the surface 138. However, as can be seen in FIGS. 5A-5C, the angle the top 158 of the pole tip makes at the sides 154 and 156 changes with distance from the ABS in the yoke direction. At the ABS, the top 158 of the pole tip forms angle α1 with the cross-track direction at the edges 154 and 156. This angle for the pole tip of the pole 150 is in the same range as that for the pole tip 131 of the poles 130 and 130'. Recessed from the ABS, the top 158 of the pole tip forms angle α2 with the cross-track direction at the edges 154 and 156. Further α2<α1. The angle the top 158 of the pole tip forms with the cross-track direction may change continuously with distance from the ABS. As can be seen in FIG. 5C, the height of the pole 150 in the down track direction still increases with increasing distance from the ABS. However, because the angle that the top 158 makes with the cross-track track direction decreases with distance from the ABS, the height of the pole 150 does not increase as rapidly as the height of the pole 130 does. This can be seen in FIG. 5C, in which the height of the pole 130 in the yoke direction is shown by a dotted line. In the embodiment shown, the angles the top 158 makes at the sides 154 and 156 are the same at a given distance from the ABS. Stated differently, the convex top 158 of the pole tip is symmetric in the cross-track direction.

At the ABS, the write gap 145 is conformal with the top 158 of the pole tip in the cross-track direction. Because the write gap 145 is conformal, the portion of the trailing shield 158 opposite to the convex portion of the top 158 may be concave. In the embodiment shown, the write gap 145 also includes overhangs which extend past the gap 141 and reside over a portion of the side shields 146. The thickness of the write gap 145 may also be in the range described above for the write gaps 125 and 125'. Although the write gap 145 is conformal in the cross-track direction, the write gap 145 can, but need not be, conformal with the top 158 of the pole tip in the yoke direction.

The write apparatus 140 may have improved performance at higher magnetic recording areal densities. The convex top 158 of the pole tip allows the volume of the pole 150 to be increased for a constant track width. Thus, the pole 150 may provide a higher magnetic field and more desirable magnetic field gradient. Thus, field magnitude and gradient may be improved without unduly compromising the field shape. Consequently, the magnetic write apparatus 140 may exhibit improved performance, particularly at higher areal recording densities.

Figure 6:
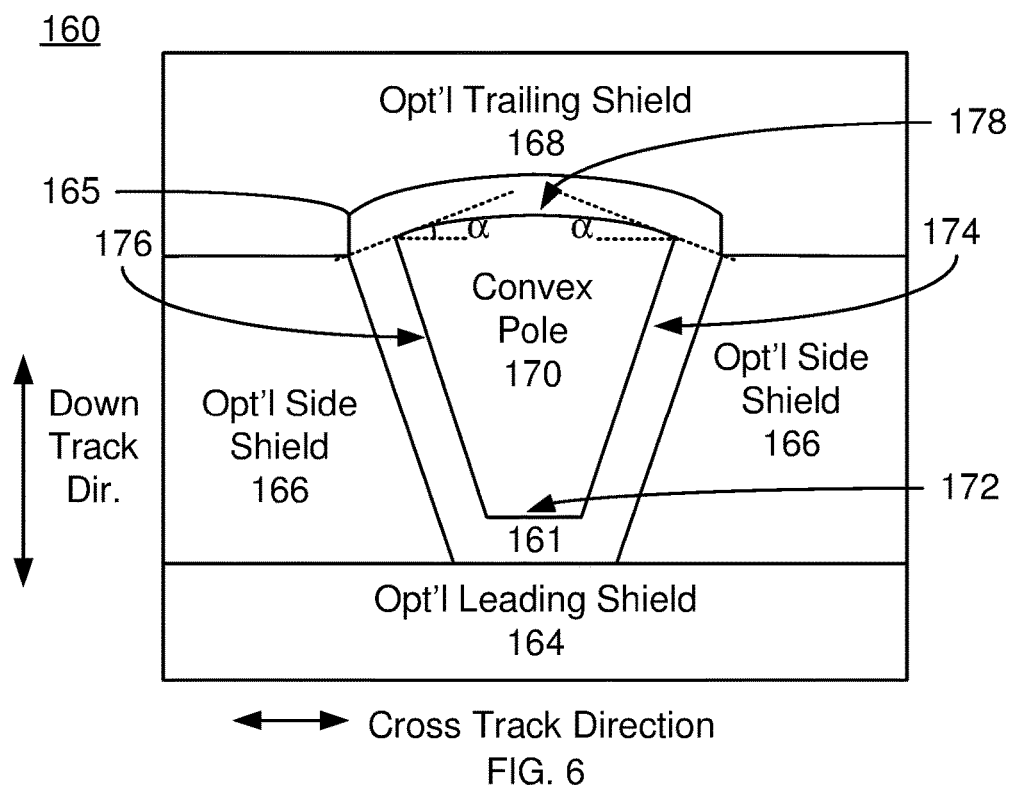
FIG. 6 depicts an ABS view of another exemplary embodiment of a magnetic write apparatus usable in a disk drive.

FIG. 6 depicts an ABS view of another embodiment of a magnetic write apparatus 160. For clarity, FIG. 6 is not to scale. For simplicity not all portions of the write apparatus 160 are shown. In addition, although the write apparatus 160 is depicted in the context of particular components other and/or different components may be used. For example, circuitry used to drive and control various portions of the disk drive is not shown. For simplicity, only single components are shown. However, multiples of each components and/or their sub-components, might be used. Thus, the write apparatus 160 includes a gap 161, an optional leading shield 164, write gap 165, optional side shields 166, optional trailing shield 168 and convex pole 170 having a pole tip, yoke (not explicitly labeled), bottom 172, sides 174 and 176 and top 178 that are analogous to the gap, optional leading shield, write gap, optional side shields, optional trailing shield and convex pole having pole tip, yoke, bottom, sides and top, respectively, described above. Although only an ABS view is shown, the pole 170 including top surface 178, trailing shield 168 and write gap 165 may vary in the yoke direction in a manner analogous to the pole, pole tip top surface, trailing shield and write gap described above.

The pole tip for pole 170 may have a width in the cross-track direction and height in the down track direction analogous to that described above for the pole tip of the pole 130, 130' and/or 150. The top 178 of the pole tip is a convex curved surface analogous to the surface 138 and 158. At the ABS, the top 178 of the pole tip forms angle α with the cross-track direction at the sides 174 and 176. This angle for the pole tip of the pole 170 is in the same range as that for the pole tip 131 of the poles 130 and 130'.

At the ABS, the write gap 165 is conformal with the top 178 of the pole tip in the cross-track direction. Because the write gap 155 is conformal, the portion of the trailing shield 168 opposite to the convex portion of the top 178 may be concave. In the embodiment shown, the write gap 165 does not include overhangs which extend past the gap 161. The thickness of the write gap 165 may also be in the range described above for the write gaps 125 and 125'. Although the write gap 165 is conformal in the cross-track direction, the write gap 165 can, but need not be, conformal with the top 178 of the pole tip in the yoke direction.

The write apparatus 160 may share the benefits of the write apparatuses 120, 120' and/or 140. The pole 170 may provide a higher magnetic field and more desirable magnetic field gradient without unduly compromising the field shape.

Consequently, the magnetic write apparatus 160 may exhibit improved performance, particularly at higher areal recording densities.

Figure 7:
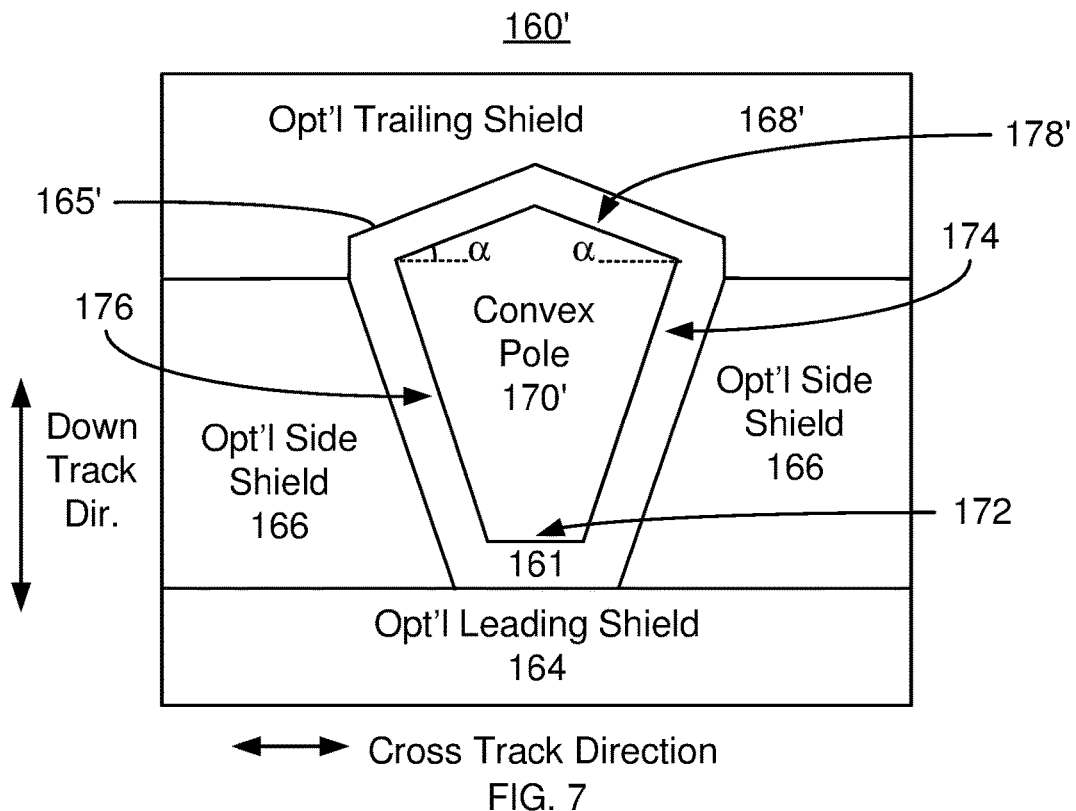
FIG. 7 depicts an ABS view of another exemplary embodiment of a magnetic write apparatus usable in a disk drive.

FIG. 7 depicts an ABS view of another embodiment of a magnetic write apparatus 160'. For clarity, FIG. 7 is not to scale. For simplicity not all portions of the write apparatus 160' are shown. In addition, although the write apparatus 160' is depicted in the context of particular components other and/or different components may be used. For example, circuitry used to drive and control various portions of the disk drive is not shown. For simplicity, only single components are shown. However, multiples of each components and/or their sub-components, might be used. Thus, the write apparatus 160' includes a gap 161, an optional leading shield 164, write gap 165', optional side shields 166, optional trailing shield 168' and convex pole 170' having a pole tip, yoke (not explicitly labeled), bottom 172, sides 174 and 176 and top 178' that are analogous to the gap, optional leading shield, write gap, optional side shields, optional trailing shield and convex pole having pole tip, yoke, bottom, sides and top, respectively, described above. Although only an ABS view is shown, the pole 170' including top surface 178', trailing shield 168' and write gap 165' may vary in the yoke direction in a manner analogous to the pole, pole tip top surface, trailing shield and write gap described above. However, in the embodiment shown in FIG. 7, the top surface 178' is a convex peaked surface. Thus, the top shield 168' is a concave peaked surface.

The write apparatus 160' may share the benefits of the write apparatuses 120, 120', 140 and/or 160. The pole 170' may provide a higher magnetic field and more desirable magnetic field gradient without unduly compromising the field shape. Consequently, the magnetic write apparatus 160' may exhibit improved performance, particularly at higher areal recording densities.

Figure 8:
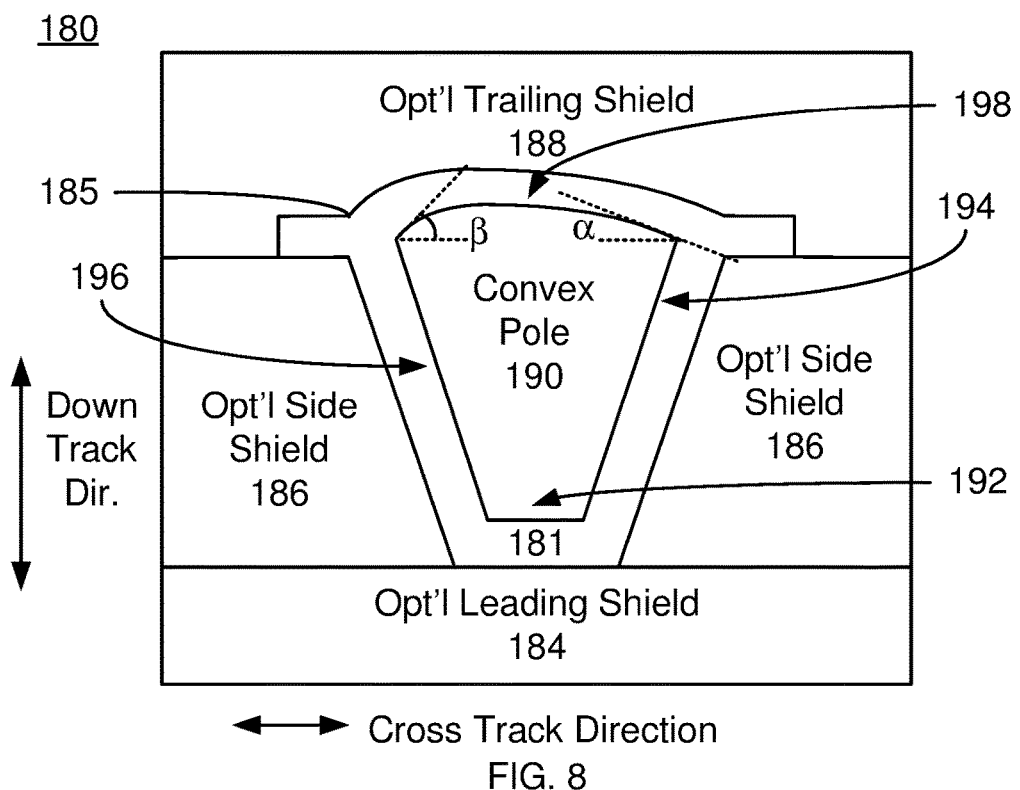
FIG. 8 depicts an ABS view of another exemplary embodiment of a magnetic write apparatus usable in a disk drive.

FIG. 8 depicts an ABS view of another embodiment of a magnetic write apparatus 180. For clarity, FIG. 8 is not to scale. For simplicity not all portions of the write apparatus 180 are shown. In addition, although the write apparatus 180 is depicted in the context of particular components other and/or different components may be used. For example, circuitry used to drive and control various portions of the disk drive is not shown. For simplicity, only single components are shown. However, multiples of each components and/or their sub-components, might be used. Thus, the write apparatus 180 includes a gap 181, an optional leading shield 184, write gap 185, optional side shields 186, optional trailing shield 188 and convex pole 190 having a pole tip, yoke (not explicitly labeled), bottom 192, sides 194 and 196 and top 198 that are analogous to the gap, optional leading shield, write gap, optional side shields, optional trailing shield and convex pole having pole tip, yoke, bottom, sides and top, respectively, described above. Although only an ABS view is shown, the pole 190 including top surface 198, trailing shield 188 and write gap 185 may vary in the yoke direction in a manner analogous to the pole, pole tip top surface, trailing shield and write gap described above.

The pole tip for pole 190 may have a width in the cross-track direction and height in the down track direction analogous to that described above for the pole tip of the pole 130, 130', 150, 170 and/or 170'. The top 198 of the pole tip is a convex curved surface analogous to the surface 138, 158 and 178. At the ABS, the top 198 of the pole tip forms angle $\alpha$ with the cross-track direction at one side 194 and another angle $\beta$ with the cross-track direction at the other 196. These angles for the pole tip of the pole 190 are in the same range as that for the pole tip 131 of the poles 130 and 130'. However, the angles $\alpha$ and $\beta$ differ. Thus, the maximum in the pole height of the pole tip is not in the center of the pole tip. Instead the maximum is closer to the side 196 having the larger angle $\beta$. In addition, the write gap 185 is shown as having overhangs that extend beyond the edges of the gap 181. In other embodiments, the write gap 185 does not have overhangs.

The write apparatus 180 may share the benefits of the write apparatuses 120, 120', 140, 160 and/or 160'. The pole 190 may provide a higher magnetic field and more desirable magnetic field gradient without unduly compromising the field shape. Consequently, the magnetic write apparatus 180 may exhibit improved performance, particularly at higher areal recording densities.

Figure 9:
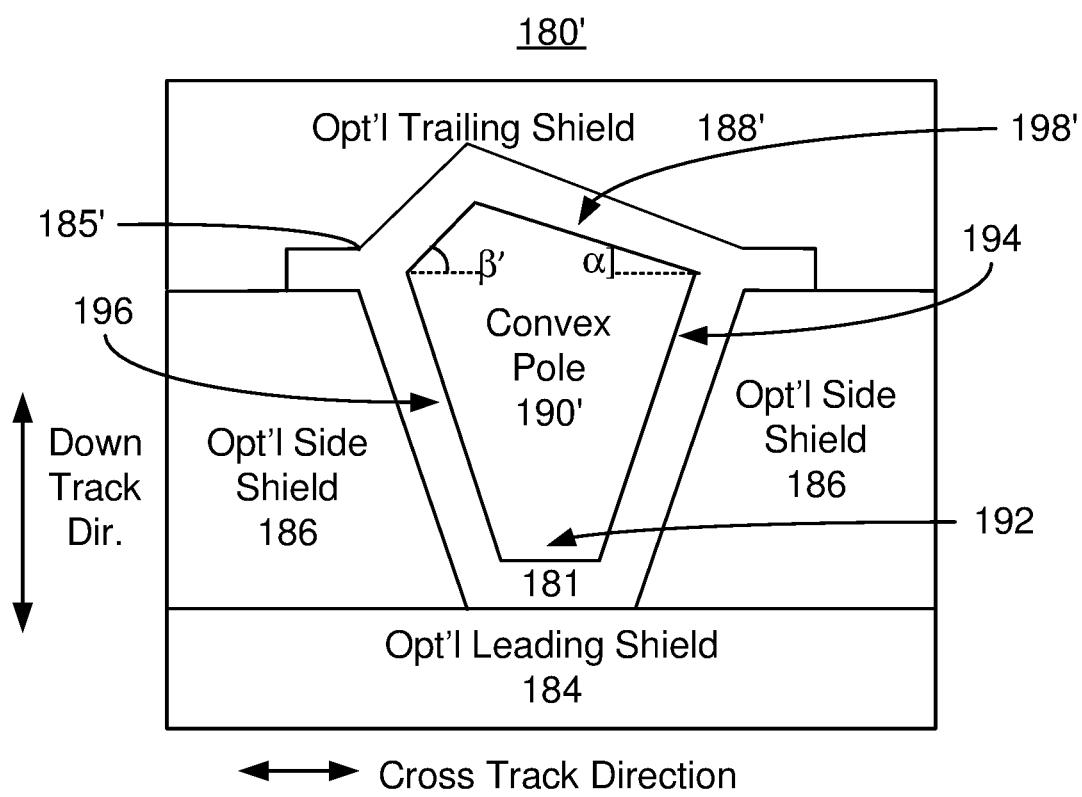
FIG. 9 depicts an ABS view of another exemplary embodiment of a magnetic write apparatus usable in a disk drive.

FIG. 9 depicts an ABS view of another embodiment of a magnetic write apparatus 180'. For clarity, FIG. 9 is not to scale. For simplicity not all portions of the write apparatus 180' are shown. In addition, although the write apparatus 180' is depicted in the context of particular components other and/or different components may be used. For example, circuitry used to drive and control various portions of the disk drive is not shown. For simplicity, only single components are shown. However, multiples of each components and/or their sub-components, might be used. Thus, the write apparatus 180' includes a gap 181, an optional leading shield 184, write gap 185', optional side shields 186, optional trailing shield 188' and convex pole 190' having a pole tip, yoke (not explicitly labeled), bottom 192, sides 194 and 196 and top 198' that are analogous to the gap, optional leading shield, write gap, optional side shields, optional trailing shield and convex pole having pole tip, yoke, bottom, sides and top, respectively, described above. Although only an ABS view is shown, the pole 190' including top surface 198', trailing shield 188' and write gap 185' may vary in the yoke direction in a manner analogous to the pole, pole tip top surface, trailing shield and write gap described above. However, in the embodiment shown in FIG. 9, the top surface 198' is a convex peaked surface. Thus, the top shield 188' is a concave peaked surface. The top 198' forms an angle, $\alpha$, with the cross-track direction at the side 194 and an angle, $\beta'$, with the cross-track direction at the side 196.

The write apparatus 180' may share the benefits of the write apparatuses 120, 120', 140, 160, 160' and/or 180. The pole 190' may provide a higher magnetic field and more desirable magnetic field gradient without unduly compromising the field shape. Consequently, the magnetic write apparatus 180' may exhibit improved performance, particularly at higher areal recording densities.

Figure 10:
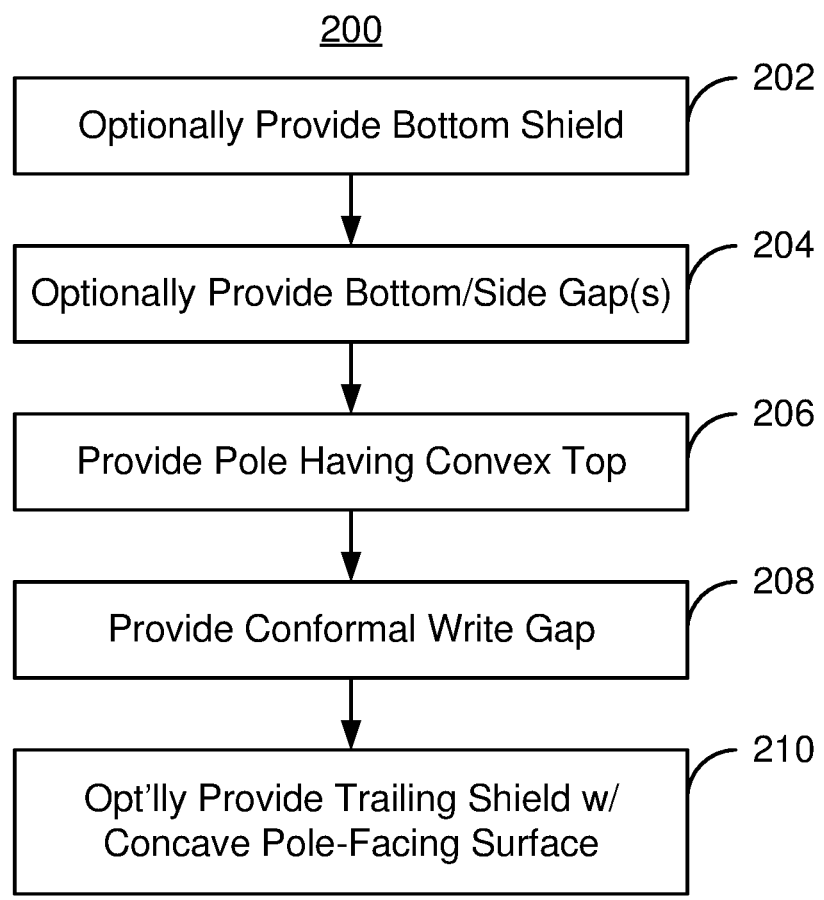
FIG. 10 is a flow chart depicting an exemplary embodiment of a method for fabricating a magnetic write apparatus drive usable in a disk drive.

FIG. 10 depicts an exemplary embodiment of a method 200 for providing a magnetic write apparatus such as a magnetic disk drive. However, other magnetic recording devices may be fabricated. For simplicity, some steps may be omitted, interleaved, combined, performed in another order and/or include substeps. The method 200 is described in the context of providing a single magnetic recording apparatus. However, the method 200 may be used to fabricate multiple magnetic recording apparatuses at substantially the same time. The method 200 is also described in the context of particular structures. A particular structure may include multiple materials, multiple substructures and/or multiple sub-layers. The method 200 is described in the context of the write apparatus 120. However, the method 200 may be used in fabricating other write apparatuses including but not limited to the write apparatuses 120', 140, 160, 160', 180 and/or 180'. The method 200 also may start after of other portions of the magnetic recording apparatus are fabricated. For example, the method 200 may start after a read apparatus and/or other structure have been fabricated.

A bottom shield 124 may optionally be provided, via step 202. Step 202 may include providing a multilayer or monolithic (single layer) magnetic shield. In other embodiments, step 202 may be omitted. The bottom gap 125 may be provided, via step 204. Step 204 may include depositing a nonmagnetic layer. The pole 130 is provided, via step 206. In some embodiments, step 206 uses a damascene process to form the pole, by forming a trench in a layer and fabricating the pole 130 in the trench. Step 206 provides the pole such that the top is wider than the bottom and such that the top surface 138 is convex. Thus, the top 138 forming angle, α, with the cross track direction at the sides 134 and 136 is formed. For other poles, other angles may be formed. The conformal write gap 125 is formed, via step 208. The top shield 128 is provided, via step 210. Fabrication of the write apparatus 120 may then be completed.

Using the method 200, the magnetic write apparatus 120 may be provided. Apparatuses 120', 140, 160, 160', 180 and/or 180' may be fabricated in a similar fashion. Thus, the benefits described above for higher areal density recording may be achieved.

What is claimed is:

1. A magnetic write apparatus having a media-facing surface (MFS), the magnetic write apparatus comprising:
    a pole having a yoke and a pole tip between the yoke and the MFS, the pole tip including a bottom, a top wider than the bottom, a first side and a second side, the pole tip having a height between the top and the bottom, at least a portion of the top of the pole tip being convex in a cross-track direction between the first side and the second side such that the height of the pole tip is larger between the first side and the second side than at the first side and at the second side, the top of the pole tip being beveled such that the height increases in a yoke direction perpendicular to the MFS,
    wherein an angle between the top and a plane along the cross-track direction at the MFS is substantially equal to an angle between the top and the plane along the cross-track direction at a position recessed from the MFS.

2. The magnetic write apparatus of claim 1 further comprising:
    a top shield separated from the top of the pole by a write gap; and
    at least one side shield separated from the first side and the second side of the pole by a side gap.

3. The magnetic write apparatus of claim 1 wherein the top is a convex curved surface.

4. The magnetic write apparatus of claim 1 wherein the top is a convex peaked surface.

5. The magnetic write apparatus of claim 1 wherein a location of a largest height of the pole tip at the MFS is evenly spaced between the first side and the second side.

6. The magnetic write apparatus of claim 1 wherein a largest height of the pole tip at the MFS is closer to the first side than the second side.

7. The magnetic write apparatus of claim 1 wherein the angle between the top and the plane along the cross-track direction at the MFS and the angle between the top and the plane along the cross-track direction at the position recessed from the MFS are greater than zero degrees and not more than twenty degrees.

8. The magnetic write apparatus of claim 7 wherein the angles are at least five degrees and not more than ten degrees.

9. The magnetic write apparatus of claim 1 wherein the pole has a width between the first side and the second side in the cross-track direction, the width increasing for the pole tip in the yoke direction from the MFS.

10. The magnetic write apparatus of claim 1 wherein the pole tip has a width between the first side and the second side in a cross-track direction at the MFS, the width being at least forty and not more than sixty nanometers, and wherein the tallest portion is not more than one hundred nanometers.

11. A data storage device comprising:
    a slider comprising a magnetic write apparatus, the magnetic write apparatus comprising a pole, the pole comprising a yoke and a pole tip between the yoke and a media facing surface (MFS), the pole tip comprising a bottom, a top wider than the bottom, a first side and a second side, wherein at least a portion of the top of the pole tip is convex in a cross-track direction, and the top of the pole tip is beveled such that a height of the pole tip between the top and the bottom of the pole increases in a yoke direction perpendicular to the MFS,
    wherein an angle between the top and a plane along the cross-track direction at the MFS is substantially equal to an angle between the top and the plane along the cross-track direction at a position recessed from the MFS.

12. The data storage device of claim 11 wherein the top has a shape selected from a convex curved surface and a convex peaked surface.

13. The data storage device of claim 11 wherein the angle between the top and the plane along the cross-track direction at the MFS and the angle between the top and the plane along the cross-track direction at the position recessed from the MFS are at least five degrees and not more than ten degrees.

14. The data storage device of claim 13 wherein the pole has a width between the first side and the second side in the cross-track direction, the width increasing for the pole tip in the yoke direction from the MFS.

15. A method for fabricating a magnetic write apparatus having a media-facing surface (MFS), the method comprising:
    providing a pole having a yoke and a pole tip between the yoke and the MFS, the pole tip comprising a bottom, a top wider than the bottom, a first side and a second side, the pole tip having a height between the top and the bottom, at least a portion of the top of the pole tip being convex in a cross-track direction between the first side and the second side such that the height of the pole tip at the MFS is larger between the first side and the second side than at the first side and at the second side, the top of the pole tip being beveled such that the height increases in a yoke direction perpendicular to the MFS,
    wherein an angle between the top and a plane along the cross-track direction at the MFS is substantially equal to an angle between the top and the plane along the cross-track direction at a position recessed from the MFS;
    providing a write gap adjacent to and conformal with the top of the pole at the MFS; and
    providing a top shield, the write gap being between a portion of the top shield and the top of the pole, the portion of the top shield being concave at the MFS.

16. The method of claim 15 wherein the write gap further comprises an overhang extending beyond a side gap separating the first side and the second side of the pole from a side shield.

17. The method of claim 15 wherein a location of a largest height of the pole tip is evenly spaced between the first side and the second side.

18. The method of claim 15 wherein the angle between the top and the plane along the cross-track direction at the MFS and the angle between the top and the plane along the cross-track direction at the position recessed from the MFS are at least five degrees and not more than ten degrees.

19. The method of claim 18 wherein the pole has a width between the first side and the second side in the cross-track direction, the width increasing for the pole tip in the yoke direction from the MFS.

\* \* \* \* \*